(12) United States Patent
Vogel

(10) Patent No.: US 7,461,078 B2
(45) Date of Patent: Dec. 2, 2008

(54) INTERFACE SYSTEM FOR ACCESSING DATA IN A DATABASE

(76) Inventor: Marc Vogel, 9 rue de la Feuillaume, Vaucresson (FR) 92420

( * ) Notice: Subject to any disclaimer, the term of this patent is extended or adjusted under 35 U.S.C. 154(b) by 96 days.

(21) Appl. No.: 10/344,948

(22) PCT Filed: Aug. 16, 2001

(86) PCT No.: PCT/FR01/02622

§ 371 (c)(1),
(2), (4) Date: Jul. 30, 2003

(87) PCT Pub. No.: WO02/15047

PCT Pub. Date: Feb. 21, 2002

(65) Prior Publication Data

US 2004/0093318 A1 May 13, 2004

(51) Int. Cl.
*G06F 17/30* (2006.01)
(52) U.S. Cl. ............... 707/102; 704/4; 704/103 R; 704/103 Y
(58) Field of Classification Search ............ 707/4, 707/102, 103 R, 103 Y
See application file for complete search history.

(56) References Cited

U.S. PATENT DOCUMENTS

| | | | |
|---|---|---|---|
| 5,550,971 A | 8/1996 | Brunner et al. | |
| 5,649,190 A | 7/1997 | Sharif-Askary et al. | |
| 5,950,190 A | 9/1999 | Yeager et al. | |
| 6,016,394 A | 1/2000 | Walker | |
| 6,560,604 B1 * | 5/2003 | Fascenda | 707/10 |
| 6,820,083 B1 * | 11/2004 | Nagy et al. | 707/9 |
| 2006/0248016 A1 * | 11/2006 | Ginter et al. | 705/54 |

* cited by examiner

*Primary Examiner*—Don Wong
*Assistant Examiner*—Hanh B Thai
(74) *Attorney, Agent, or Firm*—Young & Thompson

(57) ABSTRACT

An interface system for accessing data stored in corresponding storage elements includes at least a zone (2) for storing data proper and a zone (3) for storing a data dictionary defining structurally the database, the data base being accessible through elements forming an access interface (4). The elements forming an access interface are associated with a dictionary (5) of interface defining descriptors, accessible through elements modifying its content to enable programming of the configuration of the elements forming an interface to be programmed by creating, suppressing or modifying descriptors in the dictionary (5) of interface defining descriptors and elements (6) are provided for automatically updating the dictionary (3) of data structurally defining the database to adapt the latter to the programmed configuration of the elements forming an interface.

16 Claims, 1 Drawing Sheet

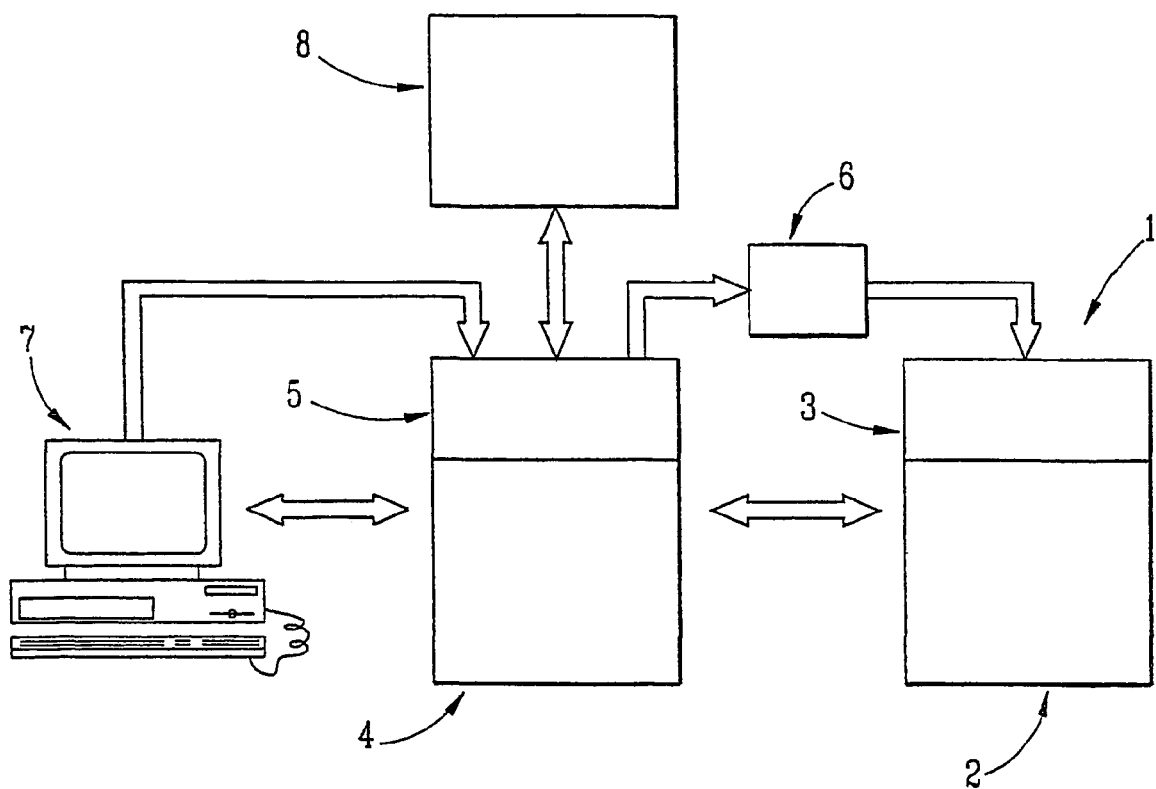

INTERFACE SYSTEM FOR ACCESSING DATA IN A DATABASE

BACKGROUND OF THE INVENTION

The present invention relates to an interface system for access to the data of a database stored in corresponding storage means.

More particularly, the invention pertains to such a system in which the storage means comprise at least one area for storing the data proper and one area for storing a data dictionary for the structural definition of this database, the database being accessible through means forming an access interface.

DESCRIPTION OF THE RELATED ART

It is known that, in general, the design of such a database and of an interface system for access to the data thereof, requires the writing of programs specific to each application.

It is however appreciated that this presents a certain number of drawbacks in particular when one desires to modify the structure of the database and/or its access interface system.

Indeed, the corresponding programs should then be revisited as a whole, so as to make the desired modifications.

It is appreciated that these modifications are relatively lengthy and complex to carry out even by qualified personnel.

To attempt to solve these problems, the document U.S. Pat. No. 5,950,190 has already proposed means forming a graphical user interface with automatic and dynamic modification for applications to relational databases.

In fact, in this document, it is explained that it is possible to modify the data dictionary for the structural definition of the database and that during each startup, the graphical user interface consults this dictionary so as to automatically accommodate the modifications made thereto.

It is appreciated that this has the advantage of allowing relatively simple and fast modification of the database and of its interface system, but that the modifications that can be made to the interface system are directly linked to the modifications that can be made to the data dictionary for the structural definition of the database which are in fact relatively restricted.

Indeed, the data dictionary for the structural definition of a database essentially contains information used by the database to carry out operations internal thereto, such as for example a search in a table or an action linked to a structural change of a table on the tables linked to it.

The dictionary of structural definition data therefore contains only very little information about the interface for accessing the base.

In view of the multiple ways of grafting an interface onto a database, the imposition of a particular interface format then amounts to the restricting of the field of application of the database.

This structural choice for a database is moreover in tune with the so-called three-tier development method used in the computer industry, this method consisting in separating the development of an application into three parts, namely the data, the logic and the interface.

The dictionary of structural definition data therefore offers only very little information for producing an interface.

Thus in order to represent a table through a graphical user interface, it is possible at best for example to enumerate the names of its columns, these names being available in the dictionary.

If one relies solely on this dictionary, one does not therefore have the means to refine this interface by specifying for example the coordinates of display on the screen of a column, its color of display, etc.

Simply displaying the name of a column is not very user-friendly either.

Indeed, databases very often impose constraints on the names of the columns. Thus for example, the use of the "space" character is often proscribed, while the size of the name of a column is limited to a few characters.

It is then appreciated that with such limitations it is very difficult to produce an intelligible and user-friendly interface.

Moreover, these modifications can only be made by a relatively qualified personnel.

SUMMARY OF THE INVENTION

The aim of the invention is therefore to solve these above problems.

Accordingly, the subject of the invention is an interface system for access to the data of a database stored in corresponding storage means, comprising at least one area for storing the data proper and one area for storing a data dictionary for the structural definition of this database, the database being accessible through means forming an access interface, characterized in that the means forming the access interface are associated with a dictionary of interface definition descriptors, which is accessible through means for modifying its contents so as to allow a programming of the configuration of the interface forming means by creating, deleting or modifying descriptors in the dictionary of interface definition descriptors and in that there are provided means for automatically updating the data dictionary for the structural definition of the database so as to adapt the latter to the programmed configuration of the means forming the access interface.

BRIEF DESCRIPTION OF THE DRAWING

The sole drawing FIGURE illustrates the invention.

DESCRIPTION OF THE PREFERRED EMBODIMENT

The invention will be better understood on reading the description which follows, given solely by way of example and with reference to the appended drawing which represents a schematic diagram illustrating the general structure of a system according to the invention.

In the subsequent description, the term "interface" will be used repeatedly to designate various systems, including interface systems for the user of the development tool, interface systems for the user of the application carried out by virtue of this development tool and systems for software interface with the database to which the invention more particularly pertains.

Indeed, represented in this FIGURE is an interface system for access to the data of a database stored in corresponding storage means, designated by the general reference 1 in this FIGURE, comprising at least one area, designated by the general reference 2, for storing the data proper, and one area for storing a data dictionary for the structural definition of this database, designated by the general reference 3, defining for example the relationships between the tables of the database, the characteristics of the columns constituting each table, etc.

The database may for example be formed by a base such as ORACLE, SQL Server, etc.

Conventionally, this database can be accessed through access interface forming means designated by the general reference 4, forming for example a graphical user interface, a software interface, etc.

According to the invention, these access interface forming means are associated with a dictionary, designated by the general reference 5, of interface definition descriptors, which can be accessed through means for modifying its contents so as to allow a programming of the configuration of the interface forming means by creating, deleting or modifying descriptors in the dictionary of interface definition descriptors.

Moreover, there are provided means 6 for automatically updating the data dictionary 3 for the structural definition of the database so as to adapt the latter to the programmed configuration of the means forming the access interface.

In fact, the interface forming means may for example be associated with a graphical user interface designated by the general reference 7, used for example by the design of the applications.

This graphical interface then allows a user to access the means forming the access interface and more particularly the dictionary of interface definition descriptors so as to ensure for example the programming thereof.

These descriptors are already well known in the state of the art, so they will not be described in greater detail subsequently.

It will simply be noted that these descriptors are used to describe for example an object or a function and are utilized in accordance with a preset convention.

In fact, this allows extremely simple definition of the interface for accessing the data of the database.

These means forming the access interface 4 are also associated for example with means 8 storing a library of preset descriptors, which are selectable and configurable for example by the user, by virtue of the graphical interface 7, for programming the configuration of the interface forming means according to a prebuilt application.

It is indeed appreciated that templates of descriptors corresponding to predefined applications can be preset and stored in the storage means 8, so as to allow a user for example, by virtue of the graphical user interface 7, to select one or other of these preset descriptors in order to create his own application from a preset application template.

It goes without saying of course that the means 8 for storing the library of preset descriptors can not only store basic templates of descriptors, but also preset collections of basic templates.

In the present patent application, the term "descriptor" therefore pertains to a basic template of a descriptor or to a collection of basic descriptors, since such a collection can also be defined by a collection descriptor making reference to basic descriptors.

The use of these descriptors makes it possible to simplify the creation or the modification of an application, since they are not directly linked to the data dictionary for the structural definition of the database.

When a user for example desires to create or modify a database, he then works from the library of preset descriptors so as to construct a dictionary of interface definition descriptors in accordance with his desires.

This is done by creating, deleting or modifying descriptors in this dictionary.

Descriptors which have already been used can thus be repeated for example by copying.

The user interface is then automatically adapted in a conventional manner using corresponding information contained in the descriptors.

It is appreciated that such a structure allows the user to save a great deal of time during the development or the modification of an application.

As has been indicated previously, means for automatically updating the data dictionary 3 for the structural definition of the database are also used to adapt the latter to the programmed configuration of the means forming the access interface.

In fact, these updating means can be adapted to modify it dynamically so as to adapt it in real time to the programmed configuration of the means forming the access interface as and when they are set up by the user.

These means are then responsible for optimizing the configuration of the data dictionary for the structural definition of the database as a function of the dictionary of interface definition descriptors.

Thus for example with each descriptor can be associated a program for modifying the database.

Thus for example, if the user desires to add a field for inputting an item of information into a page by using a certain number of descriptors, he instigates the execution of an associated update program which creates a column in a table of the database so as to serve as a receptacle for the values of the field.

As has been indicated previously, the interface definition descriptors are not directly linked to the data dictionary for the structural definition of the database.

Of course, these interface definition descriptors may pertain to various functionalities pertaining to the database, these descriptors relating to the structure of the database, of the applications, of the pages and of the fields of the latter, etc.

Descriptors may also be associated with information for accessing the corresponding data of the database so as to allow direct access thereto in the base, that is to say without consulting the data dictionary 3 for the structural definition of the database.

Indeed, this operation does not always perform well and unlike the operations of creating/modifying this dictionary, this operation does not use a standardized syntax and is therefore highly dependent on the database engine employed.

It is then appreciated that by virtue of such a structure, it is possible to design or to modify automatically in a single operation, not only the interface system, but also the structure of the database insofar as the programming of a dictionary of interface definition descriptors results automatically in the construction or the modification of a corresponding data dictionary for the structural definition of the corresponding database.

This has a certain number of advantages in particular as regards the speed of design or of modification of the system, the extraction of information, the independence between the definition of the interface forming means and of the database proper, and the possibilities of very simply and speedily upgrading the database and its interface or interfaces.

It was indicated previously that the interface forming means could be associated with a graphical user interface.

It goes without saying of course that other means of access can be envisaged, for example through software or the like, such as for example a search engine applied to a database, invoicing software making it possible to recover sums to be invoiced in a database, a generator of a mailing list, etc.

The defining of a database and of its user interface will be described hereinbelow by way of an example application.

In this example, a Web/Intranet site is constructed in order to manage a company's knowledge bases.

More particularly, the design of a knowledge base of the human resources department of this company relating to the management of the skills of its employees will be described.

Insofar as the database and its user interface are created simultaneously, the designer of the website has the impression of manipulating elements of a website and not directly those of a database.

for the structural definition of the database 3 so as to adapt the latter to the programmed configuration of the means forming the access interface.

The following tables indicate for each action of the designer of the site, the corresponding site descriptors and the repercussions on the database.

The manual creation of the site, that is to say without using preset collection descriptors, is illustrated in the table below.

In the following examples, the "site descriptors" column describes interface descriptors coming into two categories, namely, a first user interface category containing information for producing a graphical user interface and a second database gateway descriptors category containing information making it possible to access the data of the database without previously consulting the data dictionary for the structural definition thereof.

| Action of the designer | Sit descript rs | Database |
|---|---|---|
| The designer creates an empty site, giving it the name My Site and the Web address http://www.mycompany.com | User int rface<br>Site name (displayed on the screen) = My Site<br>Web address = http://www.mycompany.com<br>Database gateway<br>Path for accessing the database = for example the path for accessing the file in which the database is physically saved. Without this path, it is not possible to access the database.<br>Database password = password generated randomly in order to connect up to the database. | An empty database is created in a specified location by using the SQL command (CREATE DATABASE). The password generated previously is associated with the database.<br>Although the site is empty, the database must comprise a minimum of tables to allow the site to operate. For example, a "users" table is also created. The latter will contain the list of all the users as well as of their rights of access to the various applications. |

The first step in the creation of the site consists in creating the database proper.

The designer of this site can then use prebuilt site templates whose descriptors are for example available in the library of preset descriptors 8 for an application of this type.

In this case, the designer can then select from this library, the template which he desires. By confirming a choice, the designer instigates two main actions, the first of which is the copying of the preset and selected descriptors from the means for storing the library 8 into the dictionary of interface definition descriptors 5.

These descriptors are grouped together into multiple categories (user interface, interface with other software, structure of associated data, etc.).

The second main action consists in respect of the updating means 6, using these descriptors selected from and stored in the dictionary 5, in automatically updating the data dictionary Following the creation of this general site and insofar as this site can contain one application per department of the company, the designer will create a specific application for the human resources department. This application is in fact a knowledge base logical grouping.

In the application given by way of example, the latter groups together the knowledge base describing the skills of each employee in the company and for example other knowledge bases describing other characteristics, such as for example the salary scale, etc.

In the same way as the designer of the site has the possibility of using a site template, he has the possibility of automatically generating his application by using a prebuilt template of the application.

In the example given, the application can be created for example manually in the way illustrated in the following table.

| Action of the designer | Application descriptors | Database |
|---|---|---|
| The designer creates an application, giving it the name Human Resources. | User interface<br>Name of the application (displayed on the screen) = Human Resources<br>Database gateway<br>Table prefix for the application = in order to facilitate future manipulations of all the knowledge bases contained in the Human Resources application, the tool generates a | Insofar as an application is a logical grouping, no alteration of the database is necessary. |

| Action of the designer | Application descriptors | Database |
|---|---|---|
| | unique prefix corresponding to the first characters of the names of the tables of this application. If the prefix is HR, the Employees Skills table (when it is created) will have to have the name HR_Skills, while the salary scale will have to have the name HR_Scale. It should be noted that this prefix is deduced from the name of the application but is often different insofar as the constraints pertaining to the names of the objects of the database are numerous (limited sizes, the use of certain characters is not permitted, etc.) | |

The designer of the site can also create a knowledge base by managing for example the CVs in a human resources application. The first step of this creation consists in creating a table associated with this knowledge base. The columns of the latter then have to be defined. The designer can save time by using a template of the knowledge base directly.

This creation is illustrated in the following table.

column describing the hierarchical level of the employee in the company and a Date of birth column corresponding to his date of birth.

At this level, the designer can define each of the fields by selecting them from a set of types of fields proposed and stored, the latter having an equivalent in database form, but not necessarily since one does not always exist.

| Action of the designer | Knowledge base descriptors | Database |
|---|---|---|
| The designer creates a knowledge base, giving it the name Skills of the Employees and specifying that he wishes this to be visually the first knowledge base of the menu of the Human Resources application. | User interface<br>Name of the knowledge base (displayed on the screen) = Skills of the Employees<br>Order of appearance in the menu: position of the knowledge base in a menu presenting the knowledge bases of the Human Resources application, here the value is 1.<br>Database gateway<br>Table identifier in the application = the tool generates from the name of the knowledge base a unique identifier for the table associated with the Skills of the Employees knowledge base.<br>In this instance, here this is Employees. By using this identifier and the prefix defined for the application, the tool can easily retrieve the name of the associated table: Prefix_identifier→HR_Skills. This identifier is also generated while taking account of the constraints pertaining to the names of the objects of the database. | A table with the name HR_Skills is created using the standard "CREATE TABLE" SQL command. Although the structure of the table has not yet been defined at this level, a column Id is created to contain the unique identifier of each record. It should be noted that in certain cases, the same knowledge base can be associated to several tables. |

The last step consists in structuring the knowledge base of employees' skills.

The designer of the site will then define the characteristics of the employees knowledge base.

In the example given, the skills are associated with an employee, hence the HR_Skills table has to have at least two columns Name and Forename for each employee, a Title Thus for example, a field which can take the value yes/no, in fact corresponds to a column taking the values 1/0. The user need not be concerned with this problem insofar as the user interface does the visual conversion automatically by displaying yes instead of the value 1 no instead of the value 0.

The table below illustrates the creation of the date of birth field.

| Action of the designer | Field descriptors | Database |
|---|---|---|
| The designer creates a field named Date of birth. He specifies that the latter has to contain a date. This field must be input and displayed in $3^{rd}$ position (after the Name and Forename fields). Furthermore, | User interface<br>Name of the field (displayed on the screen) = Date of birth.<br>Order of appearance on the screen: here the value is 3.<br>Input mask: date (this makes it possible | A column of the Date type with the name DateOfBi is created using the standard "ALTER TABLE ADD COLUMN" SQL command. As the designer has specified that he desired to order the records with |

| Acti n f the d signer | Field descript rs | Database |
|---|---|---|
| he requests that the records describing the employees should always be ordered by date. | to ensure that the user does indeed input a date and not a number for example). Compulsory field: Yes (if the user does not enter any value, a message is generated). Ordered: Yes (every skills list will be ordered with respect to date of birth). Database gateway Table identifier in the application = the tool generates from the name of the field a unique identifier, for example DateOfBi for the associated column of the HR_Skills table. This identifier is also generated while taking account of the constraints pertaining to the names of the objects of the database. | respect to this column, a table index is created so as to make this operation faster. If in the future the designer decides via the design tool to no longer order with respect to this column, this index will be destroyed. |

It will be noted that in general, accesses to the database call upon a standardized and relatively simple SQL DDL language (Data Definition Language) implemented in a conventional manner by the updating means 6.

This then enables the system according to the invention to be made independent of the database engine used.

It is of course possible to interlink knowledge bases and hence to interlink tables. Knowledge base fields can correspond to several columns of the database.

It is then appreciated that once the set of descriptors of the site and of its sub-constituents has been defined, the graphical user interface can be produced easily.

As soon as a user consults for example the skills list, the following operations occur:

1) extraction of the site descriptors so as to be able to display a welcome message at the top of the page, such as for example "welcome to the site of My Site" (http://www.mycompany.com);
2) extraction of the descriptors of applications so as to offer a main menu with the set of applications of the site namely Human Resources (option selected), Research and Development, Marketing, etc.;
3) extraction of the knowledge base descriptors so as to display the list of knowledge bases specific to the Human Resources application, namely for example Skills and Salary Scales, etc.; and
4) extraction of the descriptors of fields of the Skills database so as to offer the user a search filter making it possible to list skills and ordering them with respect to the date of birth of the relevant people.

By extending the simplified template of the interface descriptors which was presented above, it is possible to define more complex interactions with the user, for example by varying the number of search criteria permitted, by using an interface to allow the inputting of skills which will go on to feed the skills base, by making the input form more aesthetic by supplying the information about the locations of the various fields or by grouping the fields into sections, etc.

It is then appreciated that, by virtue of such a system, the creation and the modification of a database are extremely fast and simple insofar as the designer works on descriptors of the interface system, the data dictionary for the structural definition of the database being adapted automatically thereto.

The invention claimed is:

1. An interface system for access to data of a database stored in corresponding storage means (1), comprising:

a computer executing a database application for accessing the data of the stored database;

at least one area (2) for storing data proper and one area (3) for storing a data dictionary for the structural definition of the database, the database being accessible through means forming an access interface (4), characterized in that the means forming the access interface (4) are associated with a dictionary (5) of interface definition descriptors, the interface definition descriptors being independent of the database structure, which dictionary (5) of interface definition descriptors is accessible through means (7, 8) for modifying contents of the dictionary (5) of interface definition descriptors so as to allow a programming of the configuration of the interface forming means by creating, deleting or modifying the interface definition descriptors in the dictionary (5) of interface definition descriptors, and in that there are provided means (6) for automatically updating the data dictionary (3) for the structural definition of the database so as to adapt the database structure to the programmed configuration of the means forming the access interface, wherein, said dictionary of interface definition descriptors includes each of the following groups:

i) a group of interface definition descriptors for user interfaces, ii) a group of interface definition descriptors for interfacing with other software, and iii) a group of interface definition descriptors for structure of associated data, said interface definition descriptors each describe one of an object and a function, said interface definition descriptors are each utilized in accordance with a corresponding preset convention, and said dictionary of interface definition descriptors is not directly linked to the data dictionary.

2. The system as claimed in claim 1, characterized in that the interface definition descriptors are associated with information for accessing the corresponding data of the database.

3. The system as claimed in claim 2, characterized in that the interface forming means are associated with a graphical user interface (7).

4. The system as claimed in claim 2, characterized in that the means (6) for automatically updating the data dictionary for the structural definition of the database, are adapted so as to modify said data dictionary dynamically in order to adapt it in real time to the programmed configuration of the means forming the access interface.

5. The system as claimed in claim 2, characterized in that interface forming means are associated with means (8) for storing library of preset, selectable and configurable descriptors for programming the configuration of the interface means according to a prebuilt application.

6. The system as claimed in claim 1, characterized in that the interface forming means are associated with a graphical user interface (7).

7. The system as claimed in claim 6, characterized in that the means (6) for automatically updating the data dictionary for the structural definition of the database, are adapted so as to modify said data dictionary dynamically in order to adapt it in real time to the programmed configuration of the means forming the access interface.

8. The system as claimed in claim 6, characterized in that the interface forming means are associated with means (8) for storing a library of preset, selectable and configurable descriptors for programming the configuration of the interface means according to a prebuilt application.

9. The system as claimed in claim 1, characterized in that the means (6) for automatically updating the data dictionary for the structural definition of the database, are adapted so as to modify said data dictionary dynamically in order to adapt it in real time to the programmed configuration of the means forming the access interface.

10. The system as claimed in claim 9, characterized in that the interface forming means are associated with means (8) for storing a library of preset, selectable and configurable descriptors for programming the configuration of the interface means according to a prebuilt application.

11. The system as claimed in claim 1, characterized in that the interface forming means are associated with means (8) for storing a library of preset, selectable and configurable descriptors for programming the configuration of the interface means according to a prebuilt application.

12. The system of claim 1, wherein, the means (7, 8) for modifying the contents of the dictionary (5) of interface definition descriptors comprises a library of preset interface definition descriptors (8) that are independent of the database structure and that, via the means (7, 8) for modifying contents of the dictionary (5) of interface definition descriptors, are copyable into the dictionary of interface definition descriptors (5).

13. The system of claim 1, wherein,
said means forming the access interface defines an access interface using said interface definition descriptors in creating an additional abstraction layer defining display rules between database content and data displayed, and
said interface definition descriptors specify each of
a name of each field to be displayed on a screen,
an order of appearance of fields on the screen,
an input mask for controlling user input, and
an indication of whether a field is a compulsory field.

14. An interface system for access to data of a database stored in corresponding storage means (1), comprising:
a computer executing a database application for accessing the data of the stored database;
a database access interface (4);
a data storage area (2) for storing data of the database having a database structure;
a data dictionary area (3) for storing a data dictionary of structural definitions of the database structure, the data dictionary defining relationships between the tables of the database and characteristics of columns constituting each table,
the database being accessible through the database access interface (4);
a dictionary (5) of interface definition descriptors, the interface definition descriptors being independent of the database structure;
dictionary modifying parts (7, 8) for modifying contents of the dictionary of interface definition descriptors so as to allow a programming of a configuration of the database access interface by creating, deleting and modifying the interface definition descriptors within the dictionary (5) of interface definition descriptors,
the database access interface (4) interacting with the dictionary (5) of interface definition descriptors through the dictionary modifying part (7, 8) for modifying the contents of the dictionary of interface definition descriptors and allowing the programming of the access interface by creating, deleting and modifying the interface definition descriptors; and
an update part (6) that automatically updates the data dictionary (3) of the database structural definitions so as to adapt the database structure to the programmed configuration of the database access interface, wherein,
said dictionary of interface definition descriptors includes each of the following groups:
iv) a group of interface definition descriptors for user interfaces,
v) a group of interface definition descriptors for interfacing with other software, and
vi) a group of interface definition descriptors for structure of associated data,
said interface definition descriptors each describe one of an object and a function,
said interface definition descriptors are each utilized in accordance with a corresponding preset convention, and
said dictionary of interface definition descriptors is not directly linked to the data dictionary.

15. The system of claim 14, wherein, the dictionary modifying parts (7, 8) comprises a library of preset interface definition descriptors (8) that are independent of the database structure and that, via the means (7, 8) for modifying contents of the dictionary (5) of interface definition descriptors, are copyable into the dictionary of interface definition descriptors (5).

16. The system of claim 14, wherein,
said means forming the access interface defines an access interface using said interface definition descriptors in creating an additional abstraction layer defining display rules between database content and data displayed.

* * * * *

UNITED STATES PATENT AND TRADEMARK OFFICE
CERTIFICATE OF CORRECTION

| | |
|---|---|
| PATENT NO. | : 7,461,078 B2 |
| APPLICATION NO. | : 10/344948 |
| DATED | : December 2, 2008 |
| INVENTOR(S) | : Marc Vogel |

It is certified that error appears in the above-identified patent and that said Letters Patent is hereby corrected as shown below:

On the title page, below Item (87), insert Item (30) as follows:

--(30)        Foreign application priority data

August 16, 2000   (FR)...... 00 10662--.

Signed and Sealed this

Twenty-fourth Day of February, 2009

JOHN DOLL
*Acting Director of the United States Patent and Trademark Office*